Jan. 10, 1950
F. ROTH
2,494,359
PHONOGRAPH RECORD HOLDER
Filed Nov. 11, 1942
4 Sheets-Sheet 1
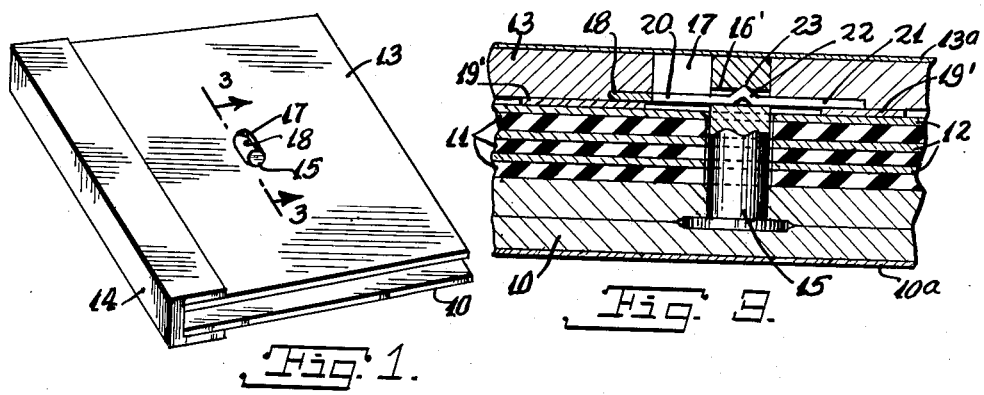
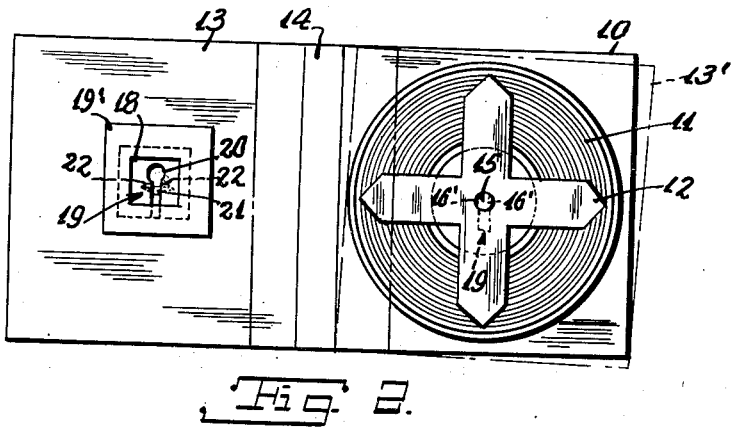
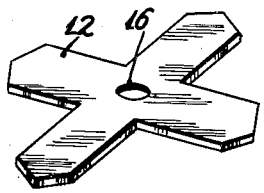
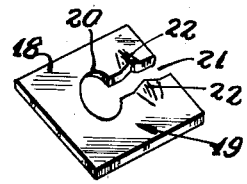
INVENTOR.
Fred Roth
BY
Zoltan H. Holocsko
ATTORNEY Jan. 10, 1950        F. ROTH        2,494,359
PHONOGRAPH RECORD HOLDER
Filed Nov. 11, 1942        4 Sheets-Sheet 2
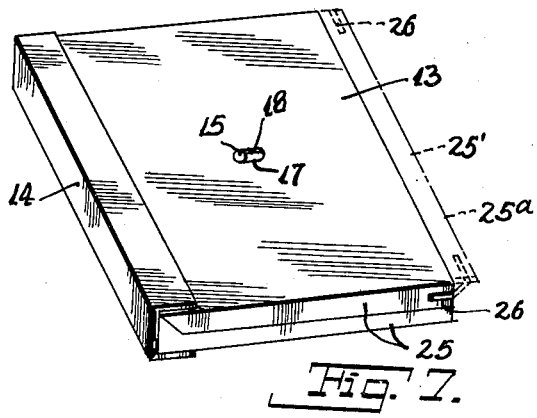
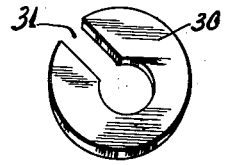
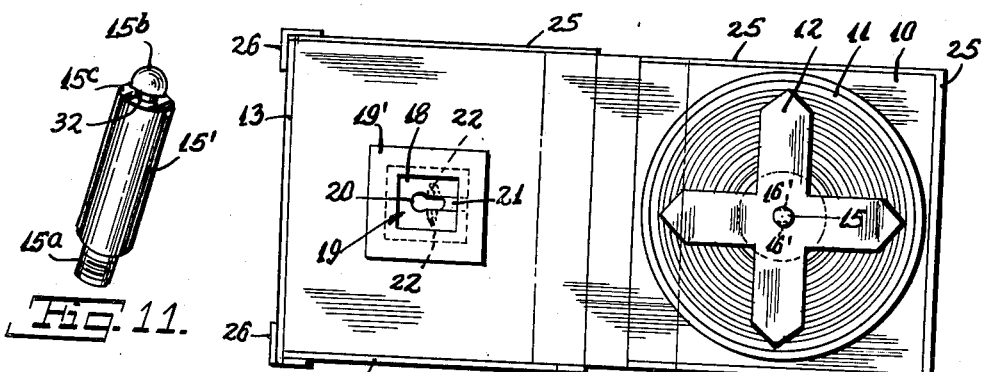
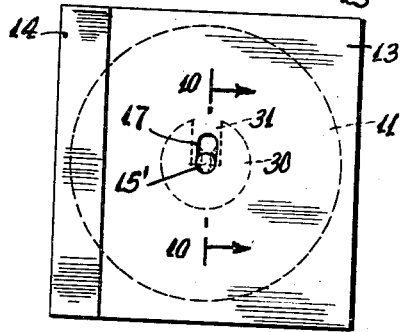
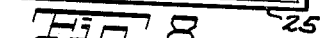
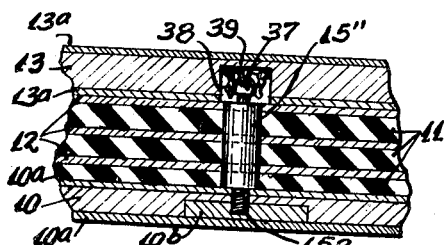
INVENTOR.
Fred Roth
BY
ATTORNEY Jan. 10, 1950 F. ROTH 2,494,359
PHONOGRAPH RECORD HOLDER
Filed Nov. 11, 1942 4 Sheets-Sheet 3
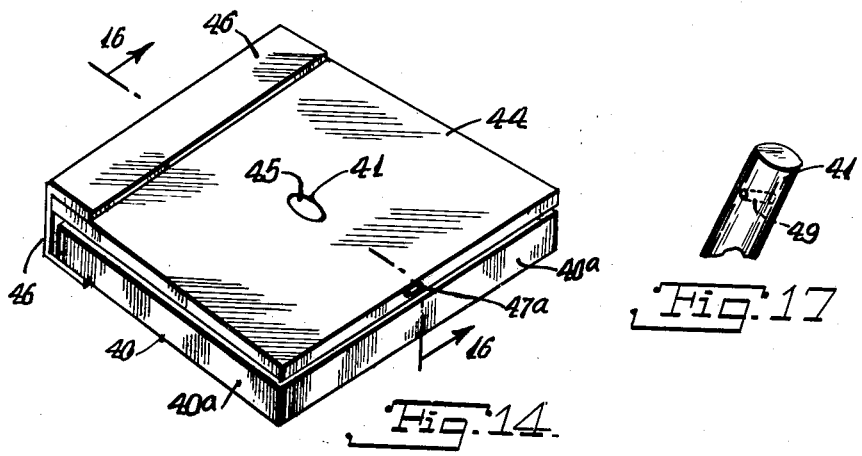
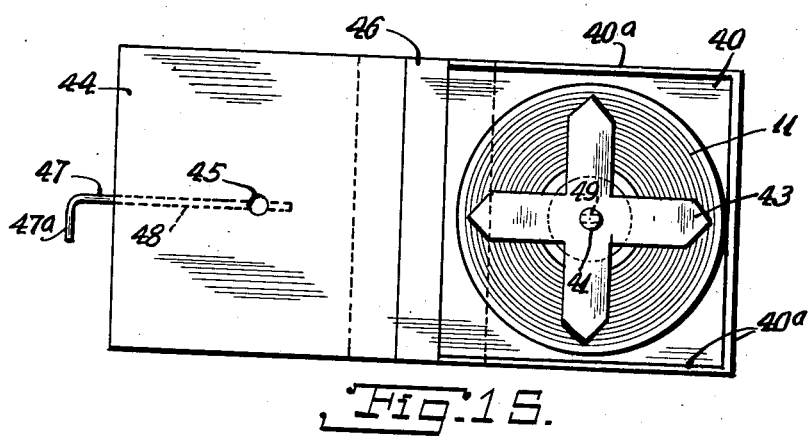
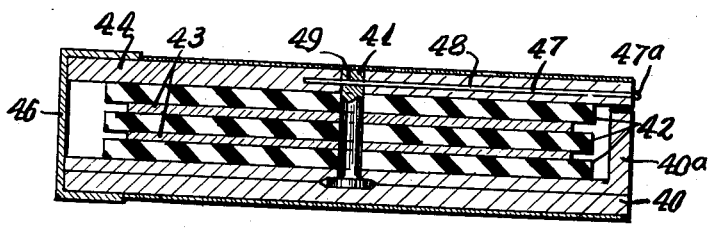
INVENTOR.
Fred Roth
BY
Zoltan H. Holcheh
ATTORNEY Jan. 10, 1950     F. ROTH     2,494,359
PHONOGRAPH RECORD HOLDER
Filed Nov. 11, 1942     4 Sheets-Sheet 4
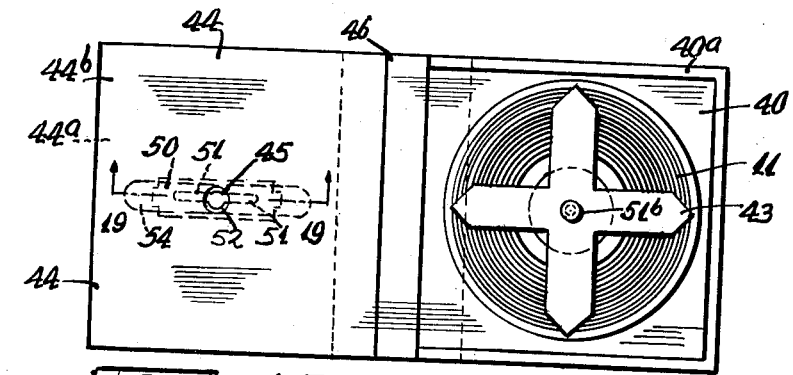
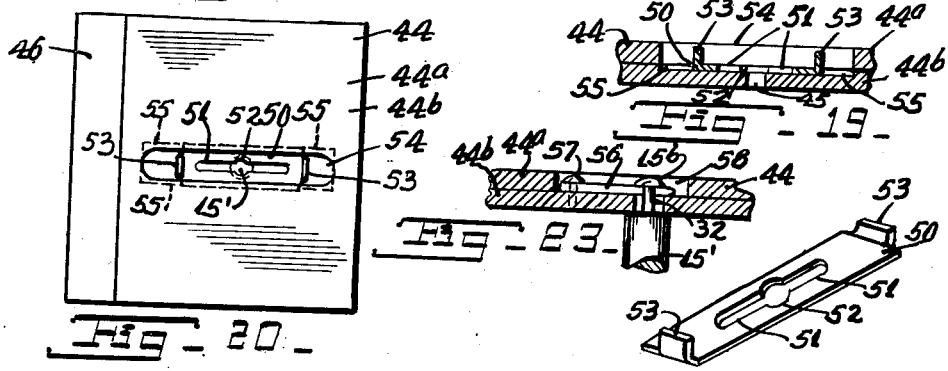
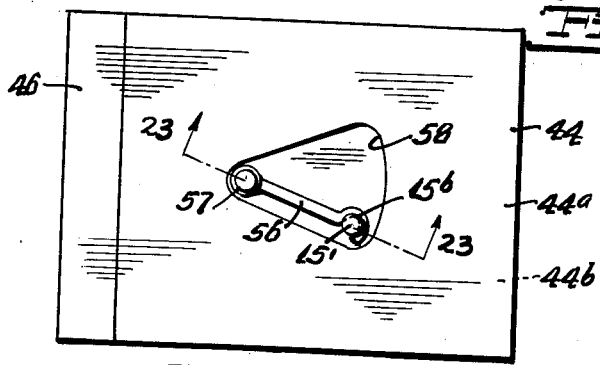
INVENTOR.
Fred Roth
BY
Zoltan Holcheck
ATTORNEY Patented Jan. 10, 1950

2,494,359

UNITED STATES PATENT OFFICE 2,494,359

PHONOGRAPH RECORD HOLDER

Fred Roth, Brooklyn, N. Y.

Application November 11, 1942, Serial No. 465,248

4 Claims. (Cl. 206—62)

This invention relates to new and useful improvements in a phonograph record holder.

More specifically, the invention proposes the construction of a phonograph record holder characterized by a bottom member for extending across the bottom of a stack of phonograph records and formed with a centrally upwardly extended stud adapted to be engaged through the central apertures of the records in a manner to maintain them in a superimposed position on the bottom member.

Another object of this invention proposes the provision of spacer elements adapted to be engaged over the central stud and between the adjacent faces of the phonograph records in a manner to hold the records spaced to prevent the sound tracks thereof from being damaged.

A still further object of the invention proposes the provision of a top member for extending across the top of the stack of phonograph records and connected with said bottom member by a flexible binding arranged in a manner to permit the top member to be engaged upon the top end of the stud.

A still further object of this invention proposes the provision of latching means on the top member adapted to engage the top end of the stud to securely lock the top member to the top end of the stud to close the record holder.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a phonograph record holder constructed in accordance with this invention.

Fig. 2 is a plan view of the record holder with the top member pivoted to an open position.

Fig. 3 is a partial enlarged vertical sectional view taken substantially on the line 3—3 of Fig. 1.

Fig. 4 is a perspective view of one of the spacer elements, per se.

Fig. 5 is a perspective view of the top end of the stud, per se.

Fig. 6 is a perspective view of the latching member, per se.

Fig. 7 is a perspective view similar to Fig. 1, but illustrating a record holder constructed in accordance with a modification of this invention.

Fig. 8 is a plan view of the modified form of record holder with the top member pivoted to an open position.

Fig. 9 is a plan view of a record holder constructed in accordance with a further modification.

Fig. 10 is an enlarged vertical sectional view taken substantially on the line 10—10 of Fig. 9.

Fig. 11 is a perspective view of the central stud used in this modified form of the invention.

Fig. 12 is a perspective view of the latching member used in this modified form of the invention.

Fig. 13 is a similar view to Fig. 10 but illustrating another modification of the invention.

Fig. 14 is a perspective view of a phonograph record holder constructed according to a still further modification.

Fig. 15 is a plan view of the record holder with its top member pivoted to an open position.

Fig. 16 is an enlarged vertical sectional view taken substantially on the line 16—16 of Fig. 14.

Fig. 17 is a perspective view of the top end of the stud used in this form of the invention.

Fig. 18 is a plan view of another record holder, with its top open in accordance with another modified form of the invention.

Fig. 19 is a sectional view, taken on the line 19—19 of Fig. 18.

Fig. 20 is a plan view of the record holder, illustrated in Fig. 18, in closed position.

Fig. 21 is a perspective view of a member shown in Fig. 18.

Fig. 22 is a similar view to Fig. 20 but showing a still further modification of the invention.

Fig. 23 is a fragmentary sectional view taken on the line 23—23 of Fig. 22.

The phonograph holder, according to this invention, comprises a bottom member 10 for extending across the bottom of a stack of phonograph records 11. This bottom member 10 is preferably constructed of stiff cardboard or other similar material and is arranged to have the records 11 stacked in a superimposed position thereon with spacer elements 12 between the adjacent faces thereof. The spacer elements 12 are constructed of relatively heavy soft paper material and are provided for keeping the adjacent faces of the records 11 out of contact with each other to protect the sound tracks thereof and prevent the records from being scratched.

A top member 13 is provided for extending across the top of the stack of phonograph records 11. This top member 13 is also constructed of relatively stiff cardboard material. Adjacent sides of the members 10 and 13 are connected together by means of a flexible binding 14. This flexible binding 14 is preferably a piece of heavy paper, cloth or yielding material, which has its edge portions adhesively secured to the top and bottom faces of the top and bottom members. The construction is such that the record holder may be opened by pivoting the top member 13 relative to the bottom member 10 in a manner similar to the method used for opening a book.

A stud 15 of wood, metal, composition or glass, extends upwardly from the center of the bottom member 10 and passes through the central apertures of the records 11 and also through aligned apertures 16 formed in the spacer elements 12. The free top end of the stud 15 is adapted to be extended through a complementary elongated opening 17 formed in the top member 13.

A latching means is provided on the top member 13 for engaging the top end of the stud 15 for locking the record holder in its closed position. This means comprises a metallic member 18 secured to the bottom face of the top member 13 by adhesive material 19'. This metallic member 18 is formed with an opening 19 extended inwards from one edge thereof and consisting of an enlarged central portion 20 and a reduced portion 21 connecting the central portion 20 with the edge portion of the metallic member 18. The enlarged central portion 20 of the opening 19 is located at one end of the elongated opening 17 in the member 13 and this portion is of a diameter slightly greater than the diameter of the stud 15, permitting the top end of the stud to pass therethrough. The sides of the stud 15 are formed with inwardly extended cutouts 16' into which the material at the sides of the narrow portion 21 of the opening 19 are adapted to be engaged. It is to be understood that the flexible binding 14 permits the top member 13 to be moved relative to the bottom member 10 out of a normal superimposed position permitting the stud to be passed through the enlarged central portion 20 of the metallic member 18, and then engaging the side portions of the narrow portion of the opening 19 with the cutouts 16'.

Means is provided for retaining the material of the metallic member 18 at the sides of the narrow portion 21 of the opening 19 engaged with the cutouts 16' formed in the sides of the stud 15. This means comprises projections 22 formed in the material of the metallic member 18 engageable with complementary recesses 23 formed in one face of the cutouts 16' in the studs 15. When the metallic member 18 is being engaged with the top end of the stud 15 the projections 22 are adapted to be snapped into position within the recesses 23 and to retain their position within these recesses until such time as they are manually forced therefrom. The record holder is shown to be bound by suitable binding sheets 10ᵃ and 13ᵃ to form a smooth finish on the outside of the members 10 and 13, respectively. However, both faces of the members 10 and 13 may also be bound with binding sheets of any desired design and material.

The operation of this form of the invention is as follows:

With the top member 13 pivoted to the open position, as shown in Fig. 2, a plurality of records 11 are stacked upon the bottom member 10 with the stud 15 passing through the central apertures of the records 11. Spacer elements 12 are engaged between the adjacent faces of the records 11 to protect their sound tracks, as hereinbefore explained. The cover or top member 13 is then pivoted to a closed position superimposed upon the stack of records 11 and the top member 13 is engaged with the top end of the stud 15 by first forcing the top member 13 out of its superimposed position upon the bottom member 10, as illustrated by the dot and dash lines 13' in Fig. 2. In this position the top end of the stud 15 may be passed through the enlarged portion 20 of the opening 19 in the metallic member 18. The top member 13 is then manually pushed back into its superimposed position upon the member 10 and this will cause the material at the sides of the reduced portion 21 of the opening 19 to pass into the cutouts 16' formed in the sides of the stud 15. Simultaneously, the projections 22 enter the recesses 23 and retain the record holder in its closed position, as shown in Fig. 1. To open the record holder the above procedure is reversed.

In the modification of the invention shown in Figs. 7 and 8 the construction of the record holder is similar to that previously described, except that the three open sides of the members 10 and 13 are formed with upwardly extended side walls 25 which are adapted to overlap each other in the closed position of the record holder as shown in Fig. 7 for completely closing all sides of the record holder. The members 10 and 13 are shown with finishing or binding sheets 10ᵃ and 13ᵃ, respectively, for producing a smooth uninterrupted binding surface. The wall 25ᵃ of the top member 13 opposed to the side provided with the binding 14 is arranged to be pivoted outwards, as indicated by the dot and dash lines 25' in Fig. 7. Elastic strips 26 are attached to the free corners of the wall 25ᵃ and adjacent wall portions 25 for urging the wall 25ᵃ into a normally operative position to overlap the adjacent wall 25 of the bottom member 10. This pivotal mounting is provided to permit the wall 25ᵃ to be pivoted out of its normal position to extend in the plane of the top wall 13 and permit the top wall 13 to be engaged with the top end of the stud 15.

In the closed position of the record holder the wall 25ᵃ will act to assist the projections 22 in retaining the top member 13 in a closed position. In other respects this form of the invention is identical to the previous form and like parts are identified by like reference numerals.

In the modification of the invention shown in Figs. 9 to 12 the construction of the record holder is characterized by a stud 15' having its reduced bottom end 15ᵃ threadedly engaging a base plate 10ᵇ of wood, plastic, metal or any other suitable material, embedded in the bottom member 10. The latching means comprises a disc 30 which is adhesively secured to the bottom face of the top member 13 and which is provided with a cutout 31 extended inwards from one edge thereof and aligned with an elongated slot 17 formed in the top member 13. An annular groove 32 extends inwards from the side of the stud 15' directly below a semi-spherical head 15ᵇ at the upper end of the stud 15' and is adapted to have a portion of the disc 30 engaged therein in a closed position of the record holder for holding the top member 13 connected to the free top end of the stud 15'. The head 15ᵇ is smaller in diameter than the diameter of the stud 15' to form a shoulder 15ᶜ upon which the upper member 13 may rest. In other respects this form of the invention is similar to the previous forms.

In the modified form of the invention shown in Fig. 13, the stud 15'' is illustrated with male snap fastener head member 37 adapted to engage a complementary female snap fastener member 38 secured in the hollow portion 39 of the top member 13. In other respects this form of the invention is similar to that shown in Fig. 10.

In the modification of the invention shown in Figs. 14 to 17 the record holder is characterized by a bottom member 40 of cardboard material having upwardly extended side walls 40ᵃ and a stud 41 which is adapted to be passed through the central openings of a stack of phonograph records 42. Spacer elements 43 are adapted to be engaged between the adjacent faces of the records 42 for holding records spaced to protect their sound tracks. A top member 44 is engageable upon the stacked records 42 and is provided with a central opening 45 through which the top end of the stud 41 is adapted to be extended. Binding material 46 connects adjacent sides of the members 40 and 44 permitting the top member 44 to be pivoted to an open position in a manner similar to the covers of a book.

Means is provided upon the top member 44 for locking the top member 44 in position on the top end of the stud 41. This means comprises a rod 47 slidably mounted within a passage 48 extended inwards from one edge of the top member 44. The top end of the stud 41 is formed with an opening 49 aligned with the passage 48 and through which the inner end of the rod 47 is adapted to be engaged as shown in Fig. 15 to lock the top member in position. The outer end of the rod 47 is bent at right angles thereto, as indicated at 47ᵃ, forming a handle by which the rod 47 may be gripped and pulled outwards to the position as illustrated in Fig. 15, to disengage the inner end of the rod 47 from the opening 49 in the stud 41 to free the top member 44 from the top end of the stud 41.

This record holder dispenses with the need of envelopes, customarily used as a container for records.

In Figs. 18 to 21 the top member 44 is provided with a slide plate 50 between the upper portion 44ᵃ and the lower portion 44ᵇ of the top member 44.

The slide plate 50 is formed with a pair of longitudinal grooves 51, which are joined by an intermediate enlarged opening 52. A pair of vertically bent handle members 53 are formed at the ends of the slide plate 50 so that the plate 50 may be moved within the top member 44.

A groove 54 is formed within the upper portion 44ᵃ of the top member 44, to permit access to the handle portions 53 of the slide plate 50. The groove 54 is narrower than the slide plate 50 so that the opposite edges adjacent the groove 54 shall form a retaining support, to prevent the slide plate 50 from falling out of position.

Grooves 55 in the upper surface of the lower portion 44ᵇ, form a track for the slide plate 50.

When the slide plate 50 is at the center position of the groove 54, it permits the head 15ᵇ to pass through the same.

Then the slide plate 50 is moved in either direction by the handles 53 until the narrow portions 51 will be located under the head 15ᵇ of the stud 15'. This sliding motion of the slide plate 50 locks the top member 44 of the record holder.

In Figs. 22 and 23 a pivoted lock hook 56 may be rotated around a pivot pin 57, within the arcuate hollow portion 58 formed in the upper portion 44ᵃ of the top member 44 for manually locking the head 15ᵇ of the stud 15'.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A phonograph record holder comprising a bottom member for extending across the bottom of a stack of phonograph records, a top member for extending across the top of said stack of phonograph records, a flexible binding connecting one of the sides of said members, a stud mounted on the bottom member for engaging through the central apertures of said records, and latching means on said top member engageable with said stud for locking said record holder closed, said latching means comprising a metallic member attached to the bottom face of said top member and formed with an opening comprising an enlarged central portion through which said stud is adapted to be passed, and a reduced portion, the side areas of which are adapted to engage opposed cutouts formed in the top end of said stud.

2. A phonograph record holder comprising a bottom member for extending across the bottom of a stack of phonograph records, a top member for extending across the top of said stack of phonograph records, a flexible binding connecting one of the sides of said members, a stud mounted on the bottom member for engaging through the central apertures of said records, and latching means on said top member engageable with said stud for locking said record holder closed, said latching means comprising a metallic member attached to the bottom face of said top member and formed with an opening comprising an enlarged central portion through which said stud is adapted to be passed, and a reduced portion, the side areas of which are adapted to engage opposed cutouts formed in the top end of said stud, and projections formed in said side areas and engaging complementary recesses formed in the cutouts of said stud to maintain said side areas engaged with said cutouts.

3. A phonograph record holder comprising a bottom member for extending across the bottom of a stack of phonograph records, a top member for extending across the top of said stack of phonograph records, a flexible binding connecting one of the sides of said members, a stud mounted on the bottom member for engaging through the central apertures of said records, and latching means on said top member engageable with said stud for locking said record holder closed, said members being formed with inwardly directed overlapping wall portions closing the open sides of said holder, and one of said wall portions being movable to an inoperative position permitting said top member to be moved relative to said bottom member to engage said latching means with the top end of said stud.

4. A phonograph record holder comprising a bottom member for extending across the bottom of a stack of phonograph records, a top member for extending across the top of said stack of phonograph records, a flexible binding connecting one of the sides of said members, a stud mounted on the bottom member for engaging through the central apertures of said records, and latching means on said top member engageable with said stud for locking said record holder closed, said latching means comprising a rod slidably extended through a passage extended inwards from one edge of said top member and said rod being arranged to have its inner end pass through a complementary opening formed in the top member of said stud.

FRED ROTH.

REFERENCES CITED

The following references are of record in the file of this patent:

UNITED STATES PATENTS

| Number | Name | Date |
|---|---|---|
| 845,390 | Baughman et al. | Feb. 26, 1907 |
| 1,585,846 | Frisbie | May 25, 1926 |
| 2,308,871 | Fenton | Jan. 19, 1943 |

FOREIGN PATENTS

| Number | Country | Date |
|---|---|---|
| 177,309 | Great Britain | Mar. 30, 1922 |
| 434,219 | Great Britain | Aug. 28, 1935 |
| 749,720 | France | May 8, 1933 |